United States Patent [19]

Beasley et al.

[11] 4,321,707
[45] Mar. 23, 1982

[54] FIBRE-OPTIC COMMUNICATION SYSTEMS

[75] Inventors: Robin D. Beasley, Chatham; Edward L. Lewis, Maidstone, both of England

[73] Assignee: Elliott Brothers (London) Limited, Chelmsford, England

[21] Appl. No.: 81,626

[22] Filed: Oct. 4, 1979

[30] Foreign Application Priority Data

Oct. 11, 1978 [GB] United Kingdom ............... 40111/78

[51] Int. Cl.³ .............................................. H04B 9/00
[52] U.S. Cl. .................................... 455/606; 356/73.1
[58] Field of Search ............... 455/601, 604, 605, 606, 455/602; 356/237, 73.1

[56] References Cited

U.S. PATENT DOCUMENTS 3,801,819  4/1974  Ohnsorge ........................... 455/601
3,981,592  9/1976  Williams ............................. 455/601
4,112,293  9/1973  Kach ................................... 455/601
4,207,561  6/1980  Steensma ........................... 356/73.1

OTHER PUBLICATIONS

ITT Brochure No. 5192/2407, ITT Optical Fibre Test Set OFTS-02-1978.

Primary Examiner—Robert L. Richardson
Assistant Examiner—Edward L. Coles
Attorney, Agent, or Firm—Kirschstein, Kirschstein, Ottinger & Cobrin

[57] ABSTRACT

A self-testing terminal for use in a fibre optic communication system comprising an optical emitter (10) which emits a predetermined amount of light and a comparator (17) which determines whether the amount of such emitted light reflected back from interfaces in the terminal or the system to an optical receiver (11) is greater than a reference value ($V_R$).

1 Claim, 3 Drawing Figures

FIBRE-OPTIC COMMUNICATION SYSTEMS

BACKGROUND OF THE INVENTION

This invention relates to a fibre optic communication systems.

BRIEF SUMMARY OF THE INVENTION

According to the present invention a terminal for use in a fibre optic communication system comprises an optical emitter, an optical receiver arranged to receive light emitted by said optical emitter after reflection at one or more interfaces of the terminal and/or the system, and means responsive to light received by said optical receiver to effect an operation.

In a particular application, said means responsive to light received by said optical receiver is arranged to activate a signal if the amount of light received is greater than a reference value.

Preferably, in such an application the terminal further comprises source means for causing said optical emitter to emit a predetermined amount of light; and said means responsive to light received by said optical receiver comprises comparator means for comparing a signal representative of the amount of light received by said optical receiver with a signal representative of said reference value; and signal means arranged to be activated by said comparator means if the amount of light received is greater than said reference value.

In another particular application, said means responsive to light received by said optical receiver is arranged to control a signal applied to said optical emitter.

Preferably, in such an application, said means responsive to light received by said optical emitter comprises means for varying a signal applied to said optical emitter so as to compensate for changes in the efficiency of said optical emitter.

It will be appreciated that where the terminal is a bidirectional terminal, the optical receiver may be the receiver ordinarily used for receiving signals through the system.

It will also be appreciated that where the terminal is a uni-directional terminal containing only a receiver or a transmitter, a transmitter or a receiver respectively may be added for the purpose of the invention.

BRIEF DESCRIPTION OF THE DRAWINGS

Two terminals in accordance with the invention will now be described, by way of example only, with reference to the accompanying drawings, in which.

DETAILED DESCRIPTION OF THE INVENTION

Figure 1:
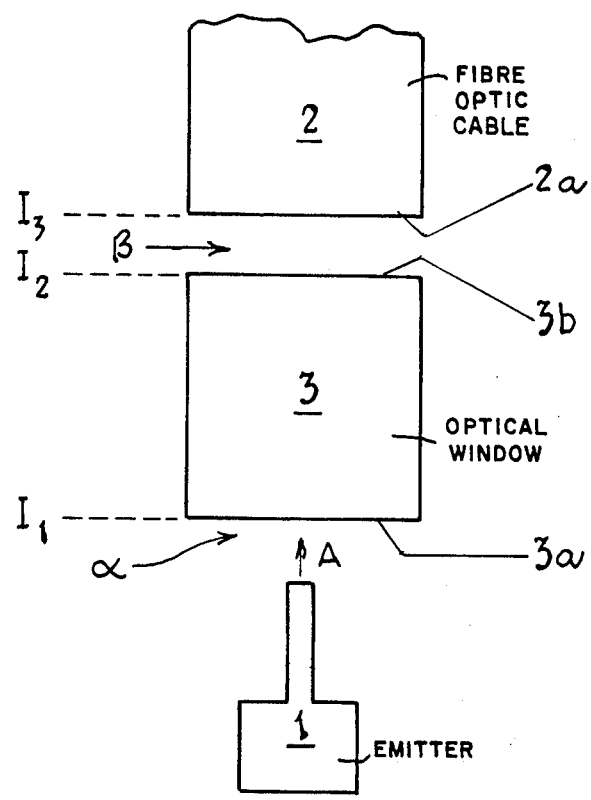
FIG. 1 shows a schematic diagram illustrating the principle of the invention.

Referring firstly to FIG. 1, an optical emitter 1 emits light onto an end of a fibre optic cable 2 through an optical window in the form of a short fibre optic cable 3. It will be appreciated that this represents the normal arrangement of an optical emitter in a system, the fibre optic cable 2 being a cable of the system into which light from the emitter 1 is to be emitted, and the emitter 1 being encased in a housing (not shown) having a window 3 through which light from the emitter 1 may pass.

Of the light energy A which is emitted from the emitter 1 a fraction x is reflected due to Fresnel reflection and a fraction $(1-x)$ is transmitted at the first interface at which that light is incident, i.e. the interface $I_1$ between the air gap $\alpha$ and the end $3a$ of the fibre optic cable 3. Of the light energy, $A(1-x)$, transmitted through this first interface, a fraction x is reflected and a fraction $(1-x)$ is transmitted at the second interface at which that light is incident, i.e. the interface $I_2$ between the end $3b$ of the fibre optic cable 3 and the air gap $\beta$. A similar process occurs at the interface $I_3$ between the air gap $\beta$ and the end $2a$ of the fibre optic cable 2 and similar processes also occur at each other interface (not shown) of the system.

It can be shown that in such a system the fraction of light energy, $R_n$, which is reflected back from the first n interfaces to before the first interface due to Fresnel reflection is given approximately by the formula $$R_n = [1-(1-x)^{2n}]/(2-x)$$

At an air/glass or a glass/air interface the value of x is approximately 4%. Inserting this value into the formula above gives values of 8% and 11% for the fractions of light energy, $R_n$, reflected back to the position of the emitter 1 from the first two and the first three interfaces, i.e. from interfaces $I_1$ & $I_2$ and $I_1$, $I_2$ & $I_3$ respectively. In a terminal according to the invention an optical receiver is arranged to receive this light and so enable an operation to be effected in response thereto.

It will be appreciated that a terminal in accordance with the invention may be tested in isolation from the rest of the system, i.e. in the absence of a fibre optic cable such as 2. In this case there are only two interfaces $I_1$ and $I_2$ from which back reflections may occur. Even so, 8% of the light will be reflected back to the position of the emitter, and this is equivalent to a $-11$dB link between the emitter and receiver, which figure is well within the normal dynamic range of current fibre optic links.

Figure 2:
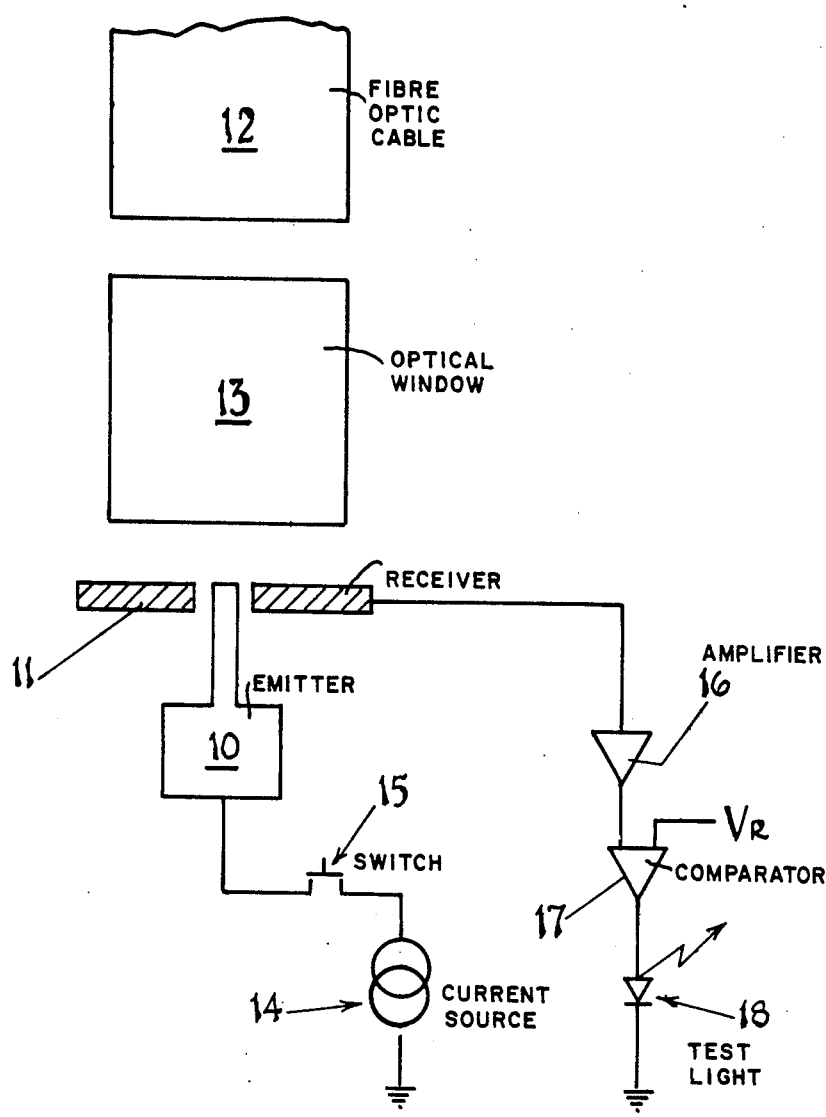
FIG. 2 shows a block diagram of a first terminal in accordance with the invention.

Referring now to FIG. 2, a first self-testing terminal in accordance with the invention includes a combined optical emitter 10 and receiver 11 arranged to respectively introduce light into and receive light from a fibre optic cable 12 of a system (not shown) through an optical window in the form of a short fibre optic cable 13. The terminal also includes a current source 14 arranged to activate the emitter 10 to emit a known amount of light energy upon closure of a test switch 15. An amplifier 16 is arranged to amplify the output signal from the receiver 11, which receives a known amount of back reflected light. The amplified output signal from the receiver is compared in a comparator 17 with a reference voltage $V_R$, corresponding to the expected amplified output from the receiver for the known amount of back reflected light received thereby, and if the comparison is satisfactory a pass test light 18 is illuminated. The known amount of light energy from the emitter 10 upon closure of the switch 15 would normally be less than that used to convey data, so as to ensure that the amount of light energy received by the receiver 11 approaches the minimum detectable value that is specified for the receiver.

It will be appreciated that essentially the same self-testing terminal could be made in accordance with the invention by using, instead of a combined emitter and receiver, a separate emitter and receiver each connected to one of the arms of a two-way optical "Y" junction whose leg is connected to a fibre optic cable, e.g. 12, of the system. It will be appreciated that in such a terminal only back reflections from interfaces after the "Y" junction will reach the receiver. This would result in the light energy reaching the receiver being reduced compared with the terminal of FIG. 2, but it may still be within the dynamic range of normal fibre optic systems.

Figure 3:
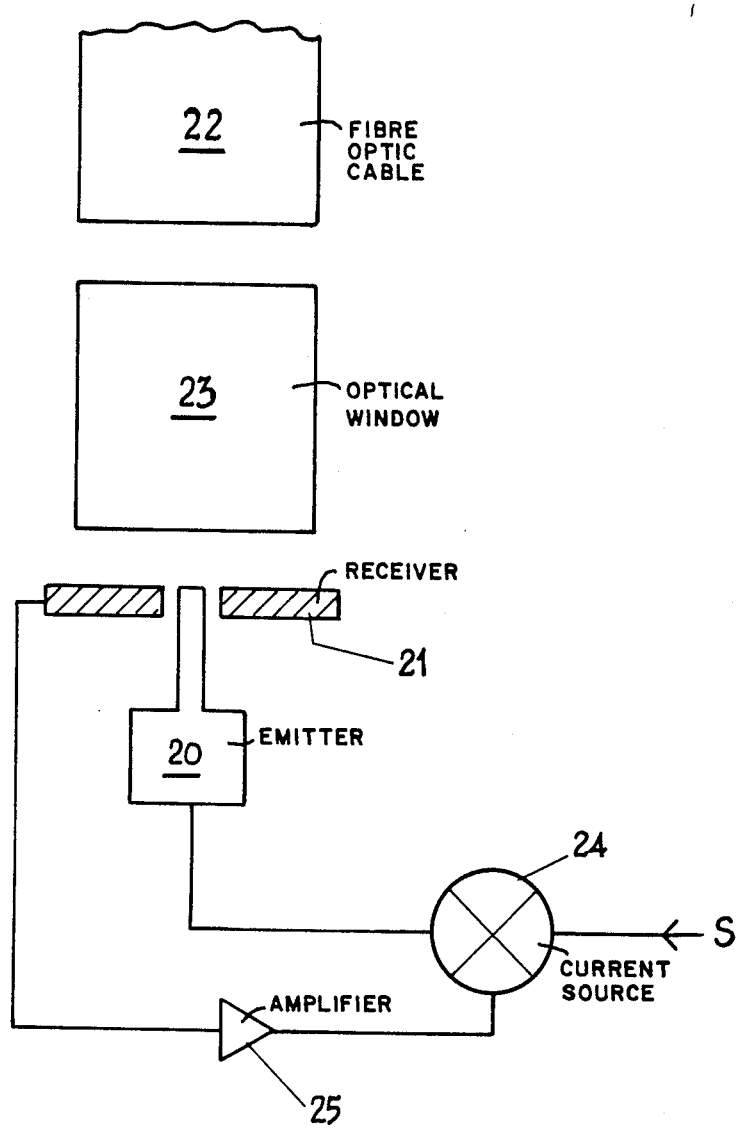
FIG. 3 shows a block diagram of a second terminal in accordance with the invention.

Referring now to FIG. 3, a second terminal in accordance with the invention includes a combined optical emitter 20 and receiver 21 arranged to respectively introduce light into and receive light from a fibre optic cable 22 of a system (not shown) through an optical window in the form of a short fibre optic cable 23. The terminal also includes a variable switched current source 24 through which electrical signals S to be emitted from the emitter 20 in optical form are applied. The output signal from the receiver is amplified through an amplifier 25 and applied to the variable switched current source 24 to vary the current applied to the emitter 20 and so to vary the light energy emitted thereby.

This configuration may be used to compensate for degradation of optical power from the emitter due to ambient temperature changes and/or due to ageing. The feedback signal from the receiver 21 to the current source 24 could also be used to operate a flag (not shown), indicating that maintenance is required, when the optical emitter does not respond correctly to the feedback signal.

Although in the foregoing terminals described by way of example emphasis has been placed upon testing the quality of the optical components, it will be appreciated that the test circuitry may be integrated into the normal terminal electronic circuitry, thus allowing the optical components and their associated electronic circuitry to be tested.

We claim:

1. A self testing terminal for use in a fibre optic communication system comprising: an optical emitter; source means for causing said optical emitter to emit a predetermined amount of light; an optical receiver arranged to receive the fraction of the light emitted by said optical emitter which is reflected back to the terminal from interfaces between adjacent optical components of the terminal or the system; comparator means for comparing a signal representative of the amount of back reflected light received by said optical receiver with a signal representative of a reference value amount of light; and signal means arranged to be activated by said comparator if the amount of back reflected light received by said receiver is greater than said reference value.

* * * * *